United States Patent [19]
Beck et al.

[11] Patent Number: 5,390,993
[45] Date of Patent: Feb. 21, 1995

[54] PRESSURE CONTROL VALVE FOR SLIP-CONTROLLED HYDRAULIC BRAKE SYSTEMS

[76] Inventors: Erhard Beck, Adolfstrasse 14, 6290 Weilburg; Anton David, Goldgrubenstrasse 15, 6071 Goetzenhain; Helmut Weisbrod, Am Nauheimer Bach 2 B, 6350 Bad Nauheim; Horst Kornemann, Rotlintstrasse 26, 6000 Frankfurt/Main 1, all of Germany

[21] Appl. No.: 144,338

[22] Filed: Nov. 1, 1993

Related U.S. Application Data

[62] Division of Ser. No. 856,072, May 8, 1992, Pat. No. 5,290,096.

[30] Foreign Application Priority Data

Sep. 8, 1990 [DE] Germany .................. 40 28 606.1

[51] Int. Cl.$^6$ .................. B60T 8/32; F16K 17/06
[52] U.S. Cl. .................. 303/113.1; 303/84.1; 185/67; 267/202
[58] Field of Search .................. 303/113.1–119.2, 303/84.1–84.2, 9.62, 9.75, 68–69, 61–63, 900, 901, DIG. 1, DIG. 2, DIG. 3, DIG. 4; 137/514, 514.3, 514.5, 514.7, 517, 540, 541; 251/297; 188/349, 67; 267/204, 201, 202, 140.11

[56] References Cited

U.S. PATENT DOCUMENTS

| | | | |
|---|---|---|---|
| 1,001,846 | 8/1911 | Harley | 137/514 |
| 2,914,085 | 11/1959 | Mercier | 137/514 |
| 3,048,188 | 8/1962 | Hunter | 137/514 X |
| 3,602,340 | 8/1971 | Budzich et al. | 251/297 X |
| 3,782,412 | 1/1974 | Darash | 137/514 |
| 3,797,805 | 3/1974 | Nielsen | 251/297 X |
| 3,870,077 | 3/1975 | Nakamura | 137/514 X |
| 4,481,974 | 11/1984 | Schmitt et al. | 137/514 |
| 5,199,769 | 4/1993 | Beck et al. | 303/84.1 X |

FOREIGN PATENT DOCUMENTS

| | | | |
|---|---|---|---|
| 1386170 | 3/1964 | France. | |
| 2617726 | 11/1976 | Germany. | |
| 2721673 | 11/1978 | Germany. | |
| 57-177466 | 11/1982 | Japan | 137/514 |
| 540730 | 10/1941 | United Kingdom. | |
| 821628 | 10/1959 | United Kingdom | 137/514 |

*Primary Examiner*—Douglas C. Butler
*Attorney, Agent, or Firm*—Robert P. Seitter; J. Gordon Lewis

[57] ABSTRACT

A pressure control valve is disclosed comprising a valve tappet (1) guided in a valve housing (3) and accommodating a compression spring (4), with a valve closure member (10) on one end of the valve tappet (1) and mating with a valve seat (9) establishing a connection between a pressure supply port (11) that emanates from a pressure fluid source and a pressure return channels (12) once the pressure attains a specific preset desired valve. In order to diminish noise, at least one friction element (2) is in engagement with the valve tappet (1) movable to abut on radial friction surfaces of the valve housing (3) and/or the valve tappet (1).

3 Claims, 2 Drawing Sheets

5,390,993

PRESSURE CONTROL VALVE FOR SLIP-CONTROLLED HYDRAULIC BRAKE SYSTEMS

CROSS REFERENCE TO RELATED APPLICATIONS

This application is a divisional application of U.S. Ser. No. 07/856,072, filed, on May 8, 1992, now U.S. Pat. No. 5,290,906 which application was a 371 of PCT/EP 91/01082 filed, Jun. 10, 1991.

BACKGROUND OF THE INVENTION

The present invention relates to a pressure control valve, in particular for the pressure fluid control in slip-controlled hydraulic brake systems.

Conventional pressure control valves for the flow control of fluids in slip-controlled hydraulic brake systems are in wide use.

Pressure control valves are known, such as described in patent application P 39 30 757.3 for example, which have a valve tappet guided in a valve housing acted upon by a compression spring. The valve tappet end remote from the compression spring is formed as a spherical closure cooperating with a valve seat in order to interrupt the pressure fluid connection between the fluid supply and return in a leak-free manner when the valve is in its closed position.

In order to diminish the occurrence of noise and particularly the solid-borne sound during the stroke movement of the valve tappet, axially extending recesses are arranged unsymmetrically around the periphery of the valve tappet which bring about a radial pressure force resultant depending on the rate of flow and thereby an attenuation of the vibration. To manufacture such a shaped valve tappet, however, additional sophisticated machining steps are required.

It is therefore an object of this invention to improve upon a pressure control valve of the type referred to in such a manner as to achieve a major reduction in noise during the valve control phase with simple cost-efficient means, while the operational reliability is safeguarded at the same time.

SUMMARY OF THE INVENTION

According to the present invention, the object set forth is achieved by the arrangement of a friction element whose radial friction surfaces are effective during the movement of the valve tappet in order to attenuate the mechanical vibrations of the valve tappet in such a manner that, on the one hand, the audible operating noises of the valve tappet are avoided and, on the other hand, possibly occurring compressional vibrations can be reduced.

The friction element can advantageously take the form of a friction ring clamped in between the inner end wall of the valve housing and the compression spring on the side of the valve tappet which ring having a bore which receives and frictionally engages the outside of the valve tappet. Upon initiation of the valve stroke movement, the engagement of the bore of the friction ring diminishes the vibrations. Likewise, as an alternative of the frictional engagement of the bore, the outside diameter of the friction ring can be in frictional engagement with the inside wall of the valve housing, a considerably larger peripheral effective surface thereby being in frictional contact as a result so that good static friction properties can be realized on start-up of the stroke movement on the tappet side.

Both design variants permit a relatively simple attachment of the friction ring in that the friction ring, preferably constructed as an elastomeric friction element, is held in proper position by the compression spring.

In order to maximize use of available space, it is particularly expedient to use a compression spring which itself generates friction forces acting in an axial direction. The compression spring may be clamped in between the internal end surface of the valve housing and an axial stop of the valve tappet, with its spring coils in frictional contact with the radial inside wall of the valve housing. It is hence possible by selecting a suitable compression spring to control the friction forces generated.

The frictional contact between the compression spring and the valve housing may be brought about by a slope of a spring abutting surface, effective transversely to the spring's longitudinal axis, on which slope one end of the compression spring is abutting. Buckling of the compression spring may thus be initiated, dependent on the spring preloading force. Hence, the frictional contact on the valve housing permits an attenuation of the vibrations which depend on the valve stroke.

Major reduction in the manufacturing costs while maintaining adequate frictional effectiveness of the compression spring can be realized in a surprisingly simple fashion by using a compression spring with an integral number of spring coils, since the oppositely disposed, equally long spring ends form spring abutment points offset from the line of effect of the spring force. This forces a lateral buckling of the compression spring, and hence results in abutment of one or more turns on the valve housing in frictional engagement therewith.

The buckling of the compression spring can also be effected by the arrangement of a slope in the end portion of the compression spring.

The present invention shall be explained in more detail in the following by way of several embodiments.

DETAILED DESCRIPTION

Figure 1:
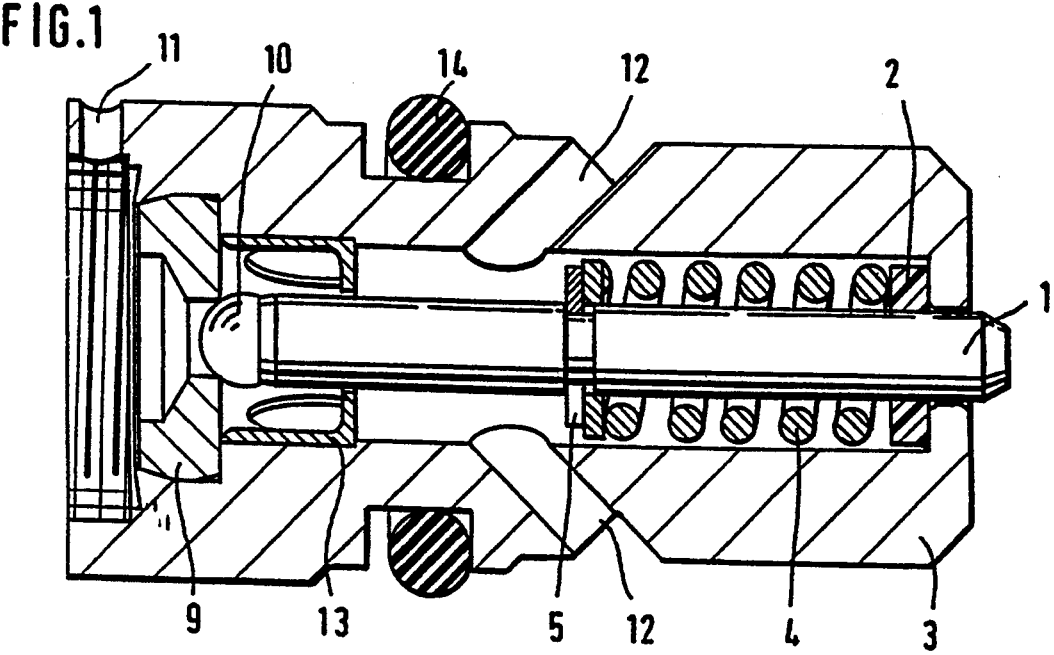
FIG. 1 is a view of a longitudinal cross-section taken through a pressure control valve with a friction element being in frictional engagement with the valve tappet.

FIG. 1 shows a pressure control valve suited for pressure fluid control in slip-controlled hydraulic brake systems, with an elongated valve tappet 1 which is movably guided in a valve housing 3 and receives a compression spring 4. A valve closure member 10 is formed on one end of the valve tappet 1 shaped to be fit to a valve seat 9. The valve closure member 10 moves off the valve seat 9 to establish a connection between a pressure supply port 11 adapted to be connected to a pressure fluid source and pressure return channels 12, once the pressure reaches a specific preset desired value.

The valve tappet 1 is arranged centrally symmetrically in a bore in the valve housing 3, designed as a hollow cylinder. To guide the valve tappet 1, the stem of the valve tappet 1 in the area of the valve seat 9 is surrounded by a cage 13 inserted into the opening of the valve housing 3. On the side remote from the valve seat, the valve tappet 1 is guided in a concentric bore which extends through the inner end wall of the valve housing 3.

Extending tangentially into the opening of the valve housing 3, are channels of pressure return 12, which are diametrally arranged and establish a connection to the pressure supply port 11 when the valve closure member 10 is opened.

Disposed in an annular groove recessed in the peripheral surface of the valve housing 3 is a ring seal 14 which pressure-fluid-tightly closes the contact surfaces on the housing side in relation to a valve block (not shown).

To attenuate any noise developing, a friction element, configured as a friction ring 2, is held against the inner end wall of the valve housing 3 by one end of the spring 4, the other end abutting on the axial stops 5 of the valve tappet 1. The friction ring 2 is an elastomeric element and has an internal bore frictionally gripping the valve tappet 1, so that as the valve tappet 1 moves, frictional scrubbing against the internal bore takes place.

Figure 2:
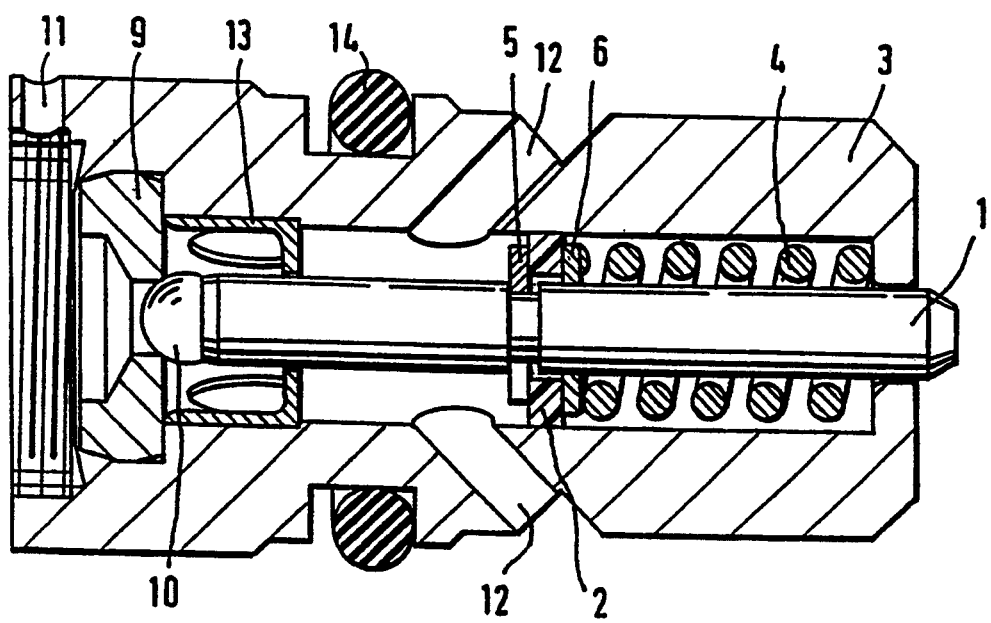
FIG. 2 is a longitudinal cross-sectional view of a design variant of FIG. 1 with a friction element being in frictional engagement with the valve housing.

Alternatively, FIG. 2 shows the arrangement of the friction ring 2 between the two axial stops 5, 6 mounted approximately at the midpoint of the valve tappet 1, which stops have the friction ring 2 clamped therebetween under the action of the compression spring 4. Thus, the friction ring 2 is carried by the valve tappet 1 and will slide with its external diameter scrubbing on the valve housing wall to be in frictional engagement therewith.

Figure 3:
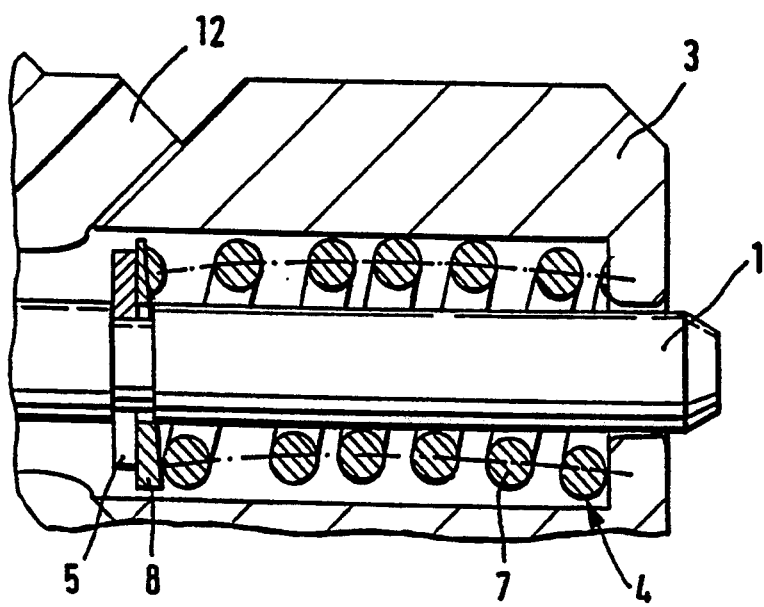
FIG. 3 is a partial view of a longitudinal cross-section of a pressure control valve using a compression spring which is buckled and in frictional abutment on the valve housing to act as a variant of the friction element of FIGS. 1 and 2.

FIG. 3 shows a slope 8 disposed on an axial stop 5 of the valve tappet 1, which slope 8 presents a tilted abutment surface exerting an uneven axial compression of the helical spring 4. The uneven axial compression causes lateral buckling of the helical compression spring 4 which here comprises the friction element. Due to this lateral buckling, and the respective dimensions of the housing bore, the inside and outside diameter of the helical spring 4, and the stem of the valve tappet is such that the outside of one or more coils 7 of the helical spring 4 will move into frictional abutment on the inside wall of the valve housing 3. At the same time, as shown in FIG. 3, inner surfaces of the coils 7 may also scrub on the outside stem of the valve tappet 1.

Figure 4:
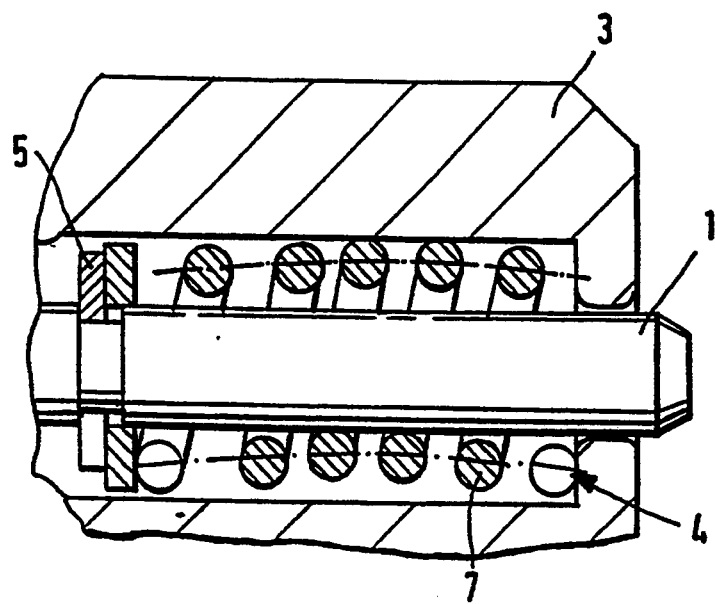
FIG. 4 is another partial view of a longitudinal cross-section through a pressure control valve, with a compression spring which is also acting as a frictional element by being buckled and in frictional engagement on the valve housing by an alternate means from that shown in FIG. 3.

The embodiment according to FIG. 4 shows a laterally directed elastic buckling deformation of the compression spring 4 which can be effected in a surprisingly straightforward manner. The helical spring is compressed in between the axial stop 5 of the valve tappet 1 and the inner end wall of the valve housing 3 and is designed with an integral number of coils 7. This design also creates uneven axial compression of the spring 4, which automatically causes lateral buckling of the compression spring 4, since the contact of the opposite spring ends are on the same side. The lateral backing causes frictional engagement of the outside of one or more coils 7 with the inside wall of the housing 3. In dependence on the spring's dimensioning, this also results, in the extreme case, in a partial frictional contacting of individual inner coil surfaces on the stem of the valve tappet 1.

We claim:

1. In a slip-controlled hydraulic brake system, a pressure control valve controlling the pressure of hydraulic fluid in said slip-controlled hydraulic brake system, said pressure control valve comprising a valve housing formed with a bore, an elongated valve tappet guided for movement in said bore in said valve housing, a compression spring received over said valve tappet and in driving engagement therewith to act on said valve tappet, said compression spring comprising a helically wound elongated form received over said valve tappet, a stop fixed on said valve tappet which an end of said compression spring contacts to establish said driving engagement with said valve tappet, an abutment formed in said valve housing, another end of said compression spring held by said abutment, said compression spring thereby compressed between said stop and said abutment to generate a spring force, a valve closure member on one end of said valve tappet, a corresponding valve seat in said valve housing configured to mate with said valve closure member, a pressure fluid source and a pressure return channel in said valve housing, said valve seat defining a fluid connection between said pressure supply port and said pressure return channel, longitudinal axial movement of said valve tappet in one direction against said spring force of said compression spring causing movement of said valve closure member off said valve seat once pressure has reached a specific pre-set desired value to allow fluid communication between said supply port and return channel, longitudinal movement of said valve tappet in the opposite direction moving said valve closure element back onto said seat, an elastomeric friction ring element received over said valve tappet, one end of said compression spring acting to hold said elastomeric ring in position, and means causing frictional scrubbing of said friction ring element by said movement of said valve tappet, said frictional scrubbing resisting said longitudinal movement of said valve tappet in both directions.

2. A pressure control valve as claimed in claim 1, wherein said valve housing has an inner end wall at one end of said valve housing bore through which said valve tappet passes, said end wall comprising said abutment, and wherein said elastomeric friction ring has an inside bore frictionally gripping said valve tappet, said elastomeric friction ring having an outside diameter received in said housing bore, said friction ring element held against said inner end wall of said valve housing by said other end of said compression spring whereby said valve tappet frictionally scrubs against the inside of said friction ring element upon longitudinal movement of said valve tappet in both directions.

3. A pressure control valve as claimed in claim 1, wherein said elastomeric friction ring element is held against said stop on said valve tappet by said one end of said compression spring to move with said valve tappet, and wherein said elastomeric friction ring element has an outside diameter tightly fit in said housing bore to be in frictional contact with said valve housing bore, said elastomeric ring having an inside bore receiving said valve tappet, whereby said valve tappet movement causes said outside diameter to frictionally scrub against the inside of said valve housing bore.

* * * * *